(12) United States Patent
Hodges et al.

(10) Patent No.: US 7,828,865 B2
(45) Date of Patent: Nov. 9, 2010

(54) GAS-LIQUID SEPARATOR WITH DUAL FLOW IMPACTION AND COALESCENCE

(75) Inventors: Daniel Y. Hodges, Madison, WI (US); Matthew T. VandenBush, Madison, WI (US); Brian W. Schwandt, Fort Atkinson, WI (US); Peter K. Herman, Stoughton, WI (US); Christopher E. Holm, Madison, WI (US); Merwyn I. Coutinho, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 323 days.

(21) Appl. No.: 12/183,232

(22) Filed: Jul. 31, 2008

(65) Prior Publication Data

US 2010/0024366 A1    Feb. 4, 2010

(51) Int. Cl.
    *B01D 50/00* (2006.01)
(52) U.S. Cl. .............. 55/320; 55/318; 55/332; 55/418; 55/420; 55/434; 55/435; 55/468; 55/DIG. 14; 55/DIG. 19; 55/DIG. 25; 55/DIG. 36; 96/397; 96/402; 96/417
(58) Field of Classification Search .......... 55/318, 55/320, 332, 416, 418–420, 434–435, 468, 55/DIG. 14, DIG. 19, DIG. 25, DIG. 36; 96/397, 402, 417; 422/105, 110, 112; 210/137, 210/141; 123/198 E
See application file for complete search history.

(56) References Cited

U.S. PATENT DOCUMENTS

| | | | | |
|---|---|---|---|---|
| 3,813,856 A | * | 6/1974 | Jensen | ................. 55/444 |
| 4,012,209 A | * | 3/1977 | McDowell et al. | ............ 96/325 |
| 4,666,473 A | * | 5/1987 | Gerdau | ................. 95/268 |
| 4,668,252 A | * | 5/1987 | Gerdau | ................. 96/189 |
| 4,993,517 A | | 2/1991 | Leipelt et al. | |
| 5,205,848 A | | 4/1993 | Blanc et al. | |
| 5,330,723 A | * | 7/1994 | Martin et al. | ............ 422/122 |
| 5,564,401 A | | 10/1996 | Dickson | |
| 6,134,874 A | | 10/2000 | Stoten | |
| 6,247,463 B1 | | 6/2001 | Fedorowicz et al. | |
| 6,279,556 B1 | | 8/2001 | Busen et al. | |
| 6,290,738 B1 | * | 9/2001 | Holm | ................. 55/309 |
| 6,350,299 B1 | * | 2/2002 | Dekker et al. | ............ 95/268 |

(Continued)

FOREIGN PATENT DOCUMENTS

DE    102005042286    4/2007

(Continued)

OTHER PUBLICATIONS

Highly Efficient Oil Separation Systems for Minimised Oil Carry Over, MtZ Apr. 2008, vol. 69, pp. 32-37.

*Primary Examiner*—Jason M Greene
*Assistant Examiner*—Dung Bui
(74) *Attorney, Agent, or Firm*—Andrus, Sceales, Starke & Sawall, LLP; J. Bruce Schelkopf

(57) ABSTRACT

A gas-liquid separator assembly has dual flow first and second split partial paths. The first path is an impaction separation path effecting liquid particle separation from a gas-liquid stream by inertial impaction. The second path is a coalescence-separation path effecting liquid particle separation from the gas-liquid stream by coalescence.

21 Claims, 3 Drawing Sheets

U.S. PATENT DOCUMENTS

| | | | |
|---|---|---|---|
| 6,354,283 B1 | 3/2002 | Hawkins et al. | |
| 6,478,018 B2 | 11/2002 | Fedorowicz et al. | |
| 6,478,019 B2 | 11/2002 | Fedorowicz et al. | |
| 6,505,615 B2 | 1/2003 | Pietschner | |
| 6,576,045 B2 * | 6/2003 | Liu et al. | 95/268 |
| 6,601,385 B2 * | 8/2003 | Verdegan et al. | 60/286 |
| 6,626,163 B1 | 9/2003 | Busen et al. | |
| 6,684,864 B1 | 2/2004 | Busen et al. | |
| 6,797,040 B2 * | 9/2004 | Lenzing | 95/267 |
| 6,895,954 B2 * | 5/2005 | Swierczyna et al. | 126/299 E |
| 7,080,636 B2 | 7/2006 | Knaus et al. | |
| 7,185,643 B2 | 3/2007 | Gronberg et al. | |
| 7,238,216 B2 | 7/2007 | Malgorn et al. | |
| 7,406,960 B2 | 8/2008 | Knauf | |
| 7,473,291 B2 | 1/2009 | Evenstad et al. | |
| 2005/0126135 A1 | 6/2005 | Kukla | |
| 2006/0059875 A1 | 3/2006 | Malgorn et al. | |
| 2007/0256566 A1 | 11/2007 | Faber et al. | |
| 2008/0264018 A1 | 10/2008 | Herman | |
| 2008/0276580 A1 | 11/2008 | Knauf et al. | |
| 2009/0050121 A1 | 2/2009 | Holzmann et al. | |
| 2009/0100811 A1 | 4/2009 | Scheckel et al. | |
| 2009/0120854 A1 | 5/2009 | Parikh et al. | |

FOREIGN PATENT DOCUMENTS

| | | |
|---|---|---|
| EP | 0754840 | 1/1997 |
| FR | 1406047 | 7/1965 |
| FR | 2852056 | 9/2004 |
| WO | WO-2007/000281 | 1/2007 |
| WO | WO-2007/028351 | 3/2007 |
| WO | WO-2007/137934 | 12/2007 |
| WO | WO-2007/138008 | 12/2007 |

* cited by examiner

GAS-LIQUID SEPARATOR WITH DUAL FLOW IMPACTION AND COALESCENCE

BACKGROUND AND SUMMARY

The invention relates to gas-liquid separators for removing liquid particles from a gas-liquid stream, including in engine crankcase ventilation separation applications, including closed crankcase ventilation (CCV) and open crankcase ventilation (OCV) systems.

Inertial gas-liquid separators are known in the prior art. Liquid particles are removed from a gas-liquid stream by accelerating the stream or aerosol to high velocities through nozzles or orifices and directing same against an impactor, typically causing a sharp directional change, effecting the noted liquid separation. In another type of known gas-liquid separator, a coalescer filter effects liquid particle separation, and coalesces separated liquid particles. These separators, namely inertial impactors and coalescers, have various uses, including in oil separation applications for blowby gases from the crankcase of an internal combustion engine.

The present invention arose during continuing development efforts in gas-liquid separator technology.

DETAILED DESCRIPTION

Figure 1:
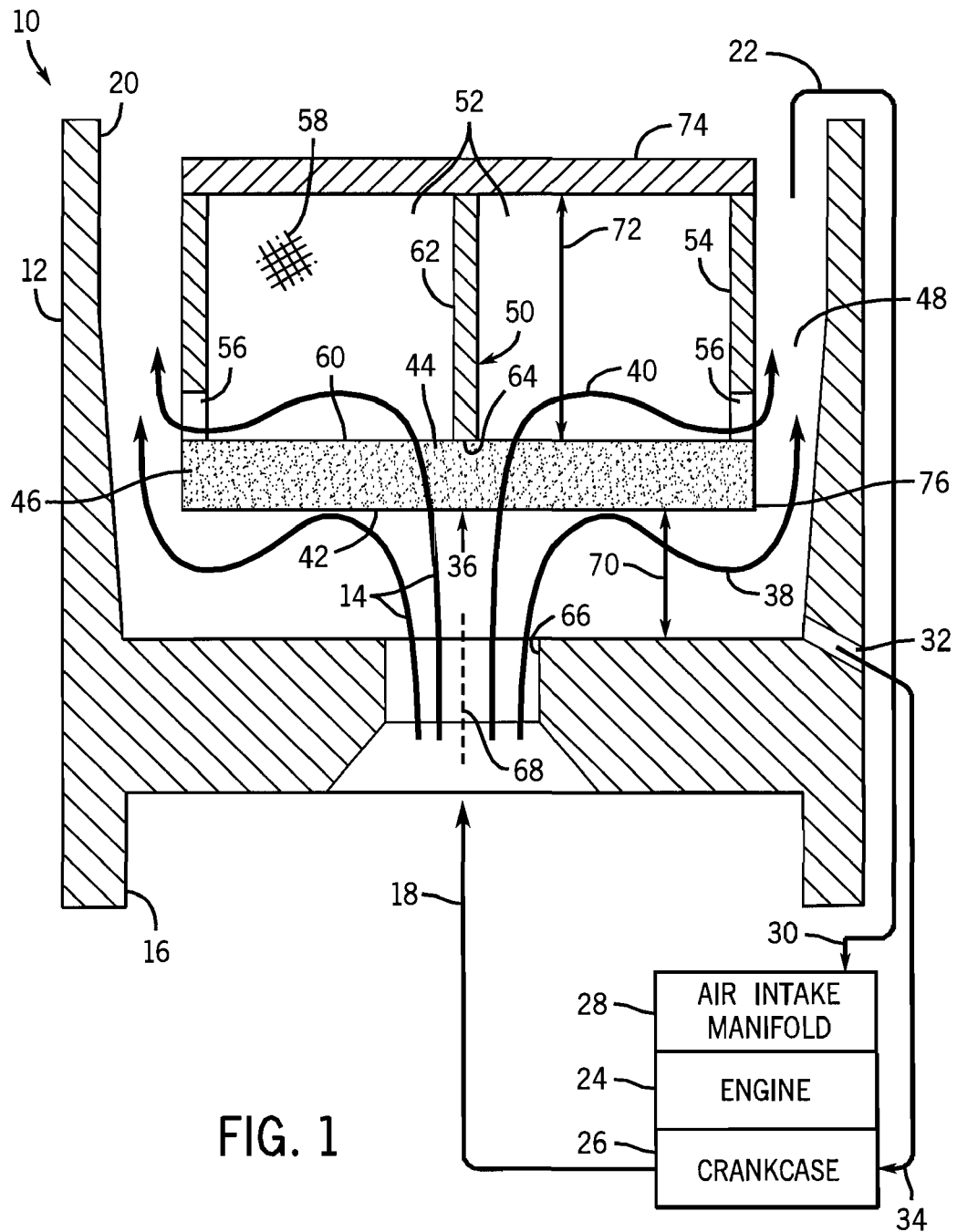
FIG. 1 is a schematic sectional view of a gas-liquid separator assembly in accordance with the invention.

FIG. 1 shows a gas-liquid separator assembly 10 including a housing 12 having a flowpath 14 therethrough from upstream to downstream. The housing has an inlet 16 receiving a gas-liquid stream 18, and an outlet 20 discharging a gas stream 22. In an exemplary crankcase ventilation separation application for an internal combustion engine 24, the separator removes liquid particles from gas-liquid stream 18 from the engine crankcase 26. In such application, it is desired to vent blowby gases from crankcase 26 of engine 24. Untreated, these gases contain particulate matter in the form of oil mist and soot. It is desirable to control the concentration of the contaminants, especially if the blowby gases are to be recirculated back to the engine's air intake system, for example at air intake manifold 28 as shown at arrow 30, providing the above noted CCV system. Alternatively, the cleaned gases 22 may be returned to atmosphere, providing the above noted OCV system. Separated liquid, e.g. oil mist droplets are drained at housing drain outlet 32 and returned to the crankcase as shown at arrow 34.

A separator 36 in the housing causes liquid particle separation from the gas-liquid stream. The noted flow path is provided by dual flow first and second paths 38 and 40. First path 38 is an impaction-separation path effecting liquid particle separation from gas-liquid stream 14 by inertial impaction. Second path 40 is a coalescence-separation path effecting liquid particle separation from gas-liquid stream 14 by coalescence. The separator includes an impactor 42 and a coalescer 44 provided by porous media 46 having a porous impaction surface at 42. The noted first path 38 is a split partial path making a sharp directional change at porous impaction surface 42 to effect liquid particle separation by inertial impaction. The noted second path 40 is a split partial path flowing through porous impaction surface 42 and into coalescer 44 to effect liquid particle separation by coalescence. The housing defines a loop-back passage 48 directing the first path 38 from porous impaction surface 42 to re-join the second path 40 downstream of coalescer 44. First and second paths 38 and 40 each flow to outlet 20 such that if coalescer 44 plugs and blocks flow of second path 40 therethrough, then the first path 38 continues to flow to outlet 20.

Separator 36 includes separation media 46 having upstream face surface 42 providing the noted porous impaction surface, and depth media 44 extending downstream from upstream face surface 42 and passing second path 40 therethrough to provide liquid particle separation by coalescence. Media support structure 50 in the housing supports separation media 46 and defines a plenum 52 downstream of upstream face surface 42 and receiving second path 40. The plenum has a sidewall 54 with one or more openings 56 passing second path 40 therethrough after coalescence. Second path 40 flows from the one or more openings 56 to outlet 20. Loop-back passage 48 directs first path 38 from porous impaction surface 42 to re-join second path 40 at the noted one or more openings 56. In one embodiment, plenum 52 is hollow. In another embodiment, plenum 52 is at least partially filled with filter media, as schematically shown at 58, which in a further embodiment may be separation media provided by coalescing media.

Separation media 46 has a downstream face surface 60 facing oppositely from upstream face surface 42 and spaced downstream thereof by depth media 44 therebetween. Media support structure 50 in the housing supports separation media 46 and includes one or more stand-off ribs 62 having an upstream face 64 engaging and supporting downstream face surface 60 of separation media 46. Gas-liquid stream 14 is accelerated against upstream face surface 42 of separation media 46 by one or more acceleration nozzles 66 spaced from upstream face surface 42 of separation media 46 along an axial direction 68 by an axial acceleration gap 70. Separation media 46 extends laterally relative to axial direction 68. Stand-off ribs 62 have a given axial length 72 from a reference or base plate 74 to set the axial length of axial acceleration gap 70. Gas-liquid stream 14 is accelerated against upstream face surface 42 of separation media 46 by the noted one or more acceleration nozzles 66 spaced from upstream face surface 42 of separation media 46 along axial direction 68 by axial acceleration gap 70. Gas-liquid stream 14 flows axially against upstream face surface 42 of separation media 46. The housing defines an exit flow passage to outlet 20 provided by the noted loop-back passage 48. First path 38 flows laterally along upstream face surface 42 of separation media 46 and then to exit flow passage 48. Second path 40 flows axially through separation media 46 and then laterally through the one or more openings 56 to exit flow passage 48. First and second paths 38 and 40 re-join in exit flow passage 48. Separation media 46 extends laterally outwardly to a laterally outward boundary 76. First path 38 flows laterally along upstream face 42 of separation media 46 and beyond laterally outward boundary 76 and then flows axially in exit flow passage 48. Separator 36 splits the flowpath into dual flow first and second split partial paths 38 and 40.

Figure 2:
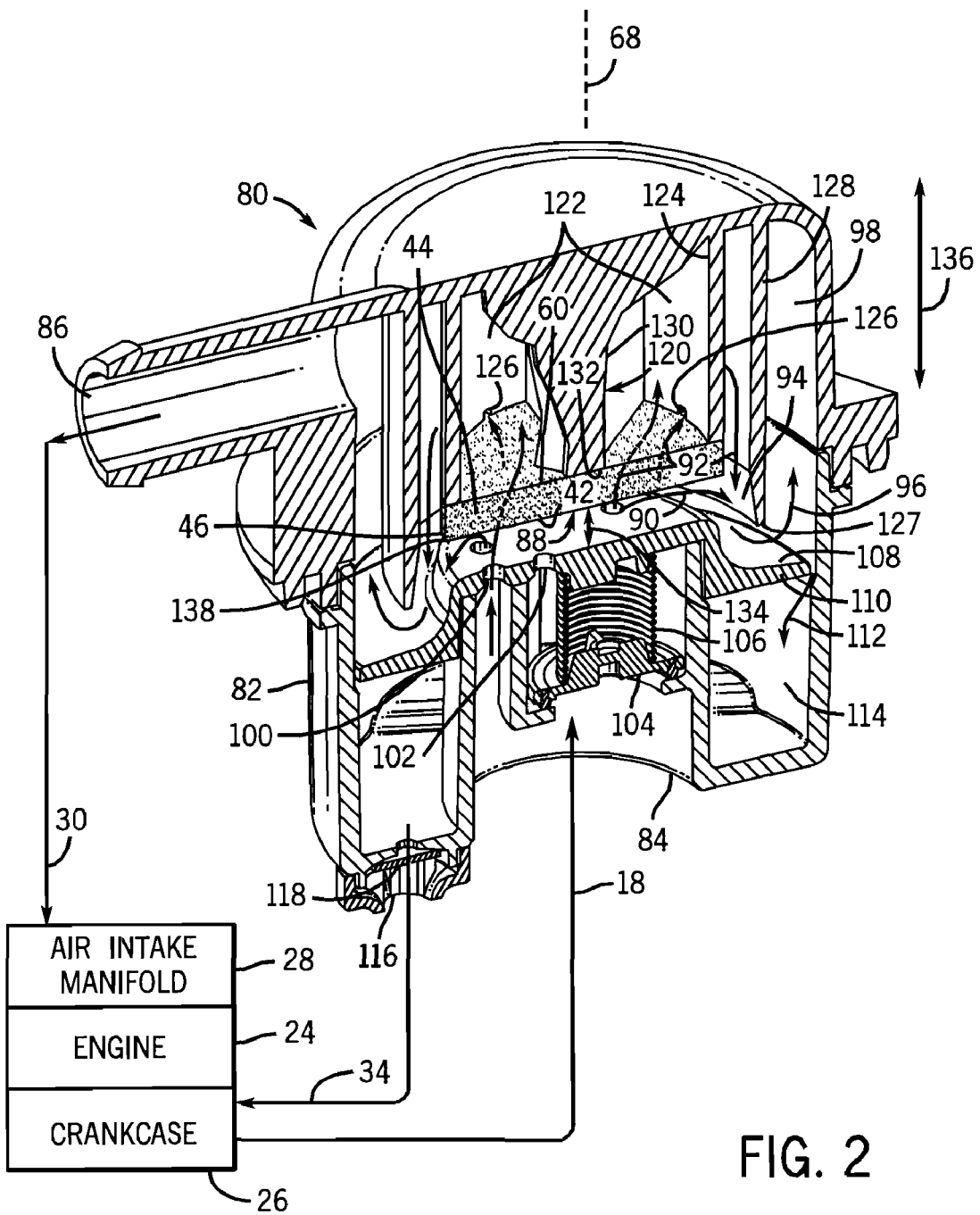
FIG. 2 is a cut-away sectional perspective view of a further embodiment of a gas-liquid separator assembly in accordance with the invention.

FIG. 2 shows a further embodiment and uses like reference numerals from above where appropriate to facilitate understanding. Gas-liquid separator assembly 80 includes a housing 82 having a flowpath therethrough from upstream to downstream. The housing an inlet 84 receiving a gas-liquid stream such as 18 from crankcase 26 of engine 24. The housing has an outlet 86 discharging a gas stream, for example as shown at 30 to air intake manifold 28 of the engine. A separator 88 in the housing, comparable to separator 36 of FIG. 1, causes liquid particle separation from the gas-liquid stream. The flowpath includes dual flow first and second paths 90 and 92. First path 90 is an impaction-separation path comparable to path 38 of FIG. 1 and effects liquid particle separation from the gas-liquid stream by inertial impaction. Second path 92 is comparable to second path 40 of FIG. 1 and is a coalescence-separation path effecting liquid particle separation from the gas-liquid stream by coalescence. Separator 88 includes an impactor 42 and a coalescer 44, comparably to FIG. 1. The impactor is provided by a porous impaction surface at 42, and first path 90 makes a sharp directional change at porous impaction surface 42 to effect liquid particle separation by inertial impaction. Second path 92 flows through porous impaction surface 42 and into coalescer 44, as in FIG. 1, to effect liquid particle separation by coalescence. The housing defines a loop-back passage 94 directing first path 90 from porous impaction surface 42 to re-join second path 92 downstream of coalescer 44. First and second paths 90 and 92 each flow as shown at arrow 96 to passage 98 and then to outlet 86. If coalescer 44 plugs and blocks flow of second path 92, then first path 90 continues to flow to outlet 86. The gas-liquid stream is accelerated through nozzles or orifices such as 100, 102 against impaction surface 42. The passage through nozzle orifice 100 is a bypass or always-open path. The passage through nozzle orifice 102 is selectively controlled by valve 104 which opens in response to increasing pressure of the gas-liquid stream overcoming the bias of spring 106. Separated liquid drains along surface 108 of flange 110 and then downwardly as shown at arrow 112 into collection plenum 114 for discharge through drain outlet 116, which may include a valve such as 118 which remains closed until a given pressure head is reached of the liquid level in plenum 114. The housing includes media support structure 120 supporting separation media 46 and defining a plenum 122 downstream of upstream face surface 42 and receiving second path 92. The plenum has a sidewall 124 with one or more openings 126 passing second path 92 therethrough after coalescence. Second path 92 flows from the one or more openings 126 and then flows axially downwardly in the orientation of FIG. 2 and rejoins first path 90 in passage 94 and then flows as shown at arrow 96 around the bottom end 127 of annular sidewall 128 and then flows axially upwardly in passage 98 and then to outlet 86. Passage 94 provides the noted loop-back passage directing first path 90 from porous impaction surface 42 to re-join second path 92 at the one or more openings 126. Plenum 122 may be hollow, or may be at least partially filled with filter media such as 58 of FIG. 1. Separation media 46 has the noted downstream face surface 60 facing oppositely from upstream face surface 42 and spaced downstream thereof by depth media 44 therebetween. Media support structure 120 in the housing supports separation media 46. The media support structure includes one or more stand-off ribs 130 having an upstream face 132 engaging and supporting downstream face 60 of separation media 46. The gas-liquid stream is accelerated against upstream face surface 42 by one or more acceleration nozzles 100, 102 spaced from upstream face surface 42 of separation media 46 by an axial acceleration gap 134. Separation media 46 extends laterally relative to axial direction 68. The one or more stand-off ribs 130 have a given axial length 136 setting the axial length of acceleration gap 134. The gas-liquid stream 18 is accelerated against upstream face surface 42 of separation media 46 by the one or more acceleration nozzles 100, 102 spaced from upstream face surface 42 of separation media 46 along axial direction 68 by acceleration gap 134. The gas-liquid stream flows axially against upstream face surface 42 of separation media 46. The housing defines an exit flow passage at the noted passages 94, 98 to outlet 86. First split partial path 90 flows laterally along upstream face surface 42 of separation media 46 to exit flow passage 94, 96. Second split partial path 92 flows axially through separation media 46 and then laterally through the one or more openings 126 to exit flow passage 94, 98. The first and second split partial paths 90 and 92 re-join in the exit flow passage 94, 98. Separation media 46 extends laterally outwardly to a laterally outward boundary 138. First split partial path 90 flows laterally outwardly along upstream face surface 42 of separation media 46 and beyond the noted laterally outward boundary 138 and then flows axially in exit flow passage 94 and then axially in exit flow passage 98.

Figure 3:
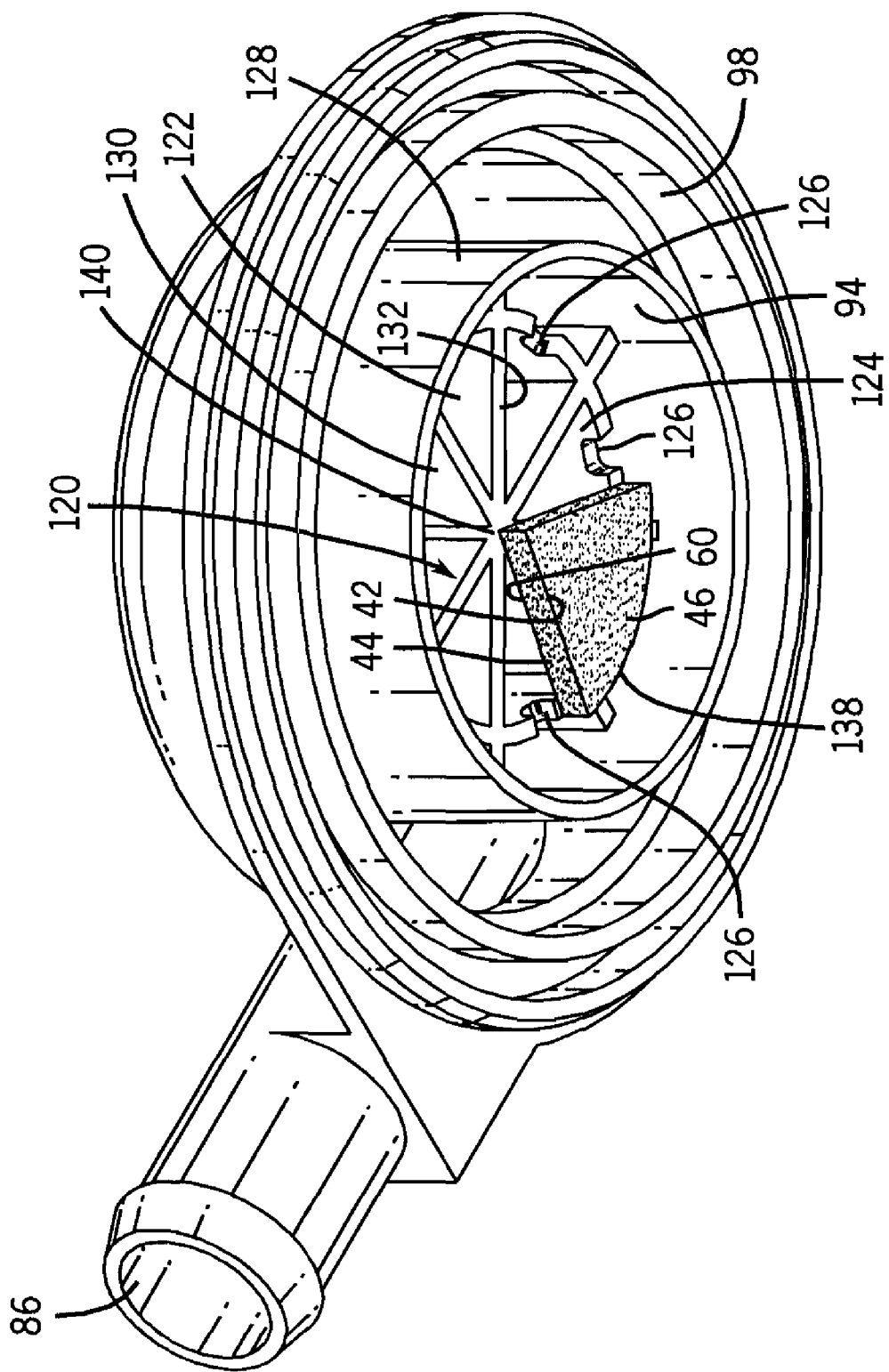
FIG. 3 is a perspective view from below of a component of FIG. 2 showing an alternate embodiment.

FIG. 3 further shows the media support structure 120 of FIG. 2 and uses like reference numerals from above where appropriate to facilitate understanding. Stand-off ribs 130 may be in the form of radially extending spokes from a central hub 140 and bounded at their outer periphery by annular circumferential sidewall 124 having the noted openings 126 therethrough. The stand-off ribs 130 have the noted upstream face 132 engaging and supporting downstream face 60 of separation media 46. The spaces between ribs 130 and between ribs 130 and wall 124 define the noted plenum 122. Housing 82 has circumferential sidewall 124 circumscribing and defining plenum 122 internally thereof and defining loop-back passage 94 externally thereof. Plenum 122 is downstream of upstream face surface 42 and receives second path 92. Stand-off ribs 130 are in plenum 122. Sidewall 124 has the noted one or more openings 126 passing second path 92 therethrough after coalescence. Stand-off ribs 130 in one embodiment are provided by a plurality of ribs extending radially outwardly in a radial spoke pattern from central hub 140 to annular circumferential sidewall 124 defining loop-back passage 94. Other rib patterns may be used.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A gas-liquid separator assembly comprising a housing having a flowpath therethrough from upstream to downstream, said housing having an inlet receiving a gas-liquid stream, and an outlet discharging a gas stream, a separator in said housing causing liquid particle separation from said gas-liquid stream, said flowpath comprising dual flow first and second paths, said first path being an impaction-separation path effecting liquid particle separation from said gas-liquid stream by inertial impaction, said second path being a coalescence-separation path effecting liquid particle separation from said gas-liquid stream by coalescence.

2. The gas-liquid separator assembly according to claim 1 wherein said separator comprises an impactor and a coalescer, said impactor comprising a porous impaction surface, said first path making a directional change at said porous impaction surface to effect liquid particle separation by inertial impaction, said second path flowing through said porous impaction surface and into said coalescer to effect liquid particle separation by coalescence.

3. The gas-liquid separator assembly according to claim 2 wherein said housing defines a loop-back passage directing said first path from said porous impaction surface to re-join said second path downstream of said coalescer.

4. The gas-liquid separator assembly according to claim 3 wherein said first and second paths each flow to said outlet such that if said coalescer plugs and blocks flow of said second path therethrough, said first path continues to flow to said outlet.

5. The gas-liquid separator assembly according to claim 2 wherein said separator comprises separation media having an upstream face surface providing said porous impaction surface, and depth media extending downstream from said upstream face surface and passing said second path therethrough to provide said liquid particle separation by coalescence.

6. The gas-liquid separator assembly according to claim 5 comprising media support structure in said housing supporting said separation media and defining a plenum downstream of said upstream face surface and receiving said second path, said plenum having a sidewall with one or more openings passing said second path therethrough after said coalescence, said second path flowing from said one or more openings to said outlet.

7. The gas-liquid separator assembly according to claim 6 wherein said housing defines a loop-back passage directing said first path from said porous impaction surface to re-join said second path at said one or more openings.

8. The gas-liquid separator assembly according to claim 6 wherein said plenum is hollow.

9. The gas-liquid separator assembly according to claim 6 wherein said plenum is at least partially filled with filter media.

10. The gas-liquid separator assembly according to claim 9 wherein said filter media is said separation media.

11. The gas-liquid separator assembly according to claim 5 wherein said separation media has a downstream face surface facing oppositely from said upstream face surface and spaced downstream thereof by said depth media therebetween, and comprising media support structure in said housing supporting said separation media, said media support structure comprising one or more stand-off ribs having an upstream face engaging and supporting said downstream face surface of said separation media.

12. The gas-liquid separator assembly according to claim 11 wherein said gas-liquid stream is accelerated against said upstream face surface of said separation media by one or more acceleration nozzles spaced from said upstream face surface of said separation media along an axial direction by an axial acceleration gap, said separation media extends laterally relative to said axial direction, and said stand-off ribs have a given axial length setting the axial length of said axial acceleration gap.

13. The gas-liquid separator assembly according to claim 12 wherein said housing has a circumferential sidewall circumscribing and defining a plenum internally thereof and defining said loop-back passage externally thereof, said plenum being downstream of said upstream face surface and receiving said second path, said stand-off ribs being in said plenum, said sidewall having one or more openings passing said second path therethrough after said coalescence.

14. The gas-liquid separator assembly according to claim 12 wherein said stand-off ribs comprise a plurality of ribs extending radially outwardly in a radial spoke pattern from a central hub to an annular circumferential sidewall defining said loop-back passage, said sidewall defining a plenum internally thereof and downstream of said upstream face surface and receiving said second path, said sidewall having one or more openings passing said second path therethrough after said coalescence.

15. The gas-liquid separator assembly according to claim 5 wherein:
said gas-liquid stream is accelerated against said upstream face surface of said separation media by one or more acceleration nozzles spaced from said upstream face surface of said separation media along an axial direction by an axial acceleration gap;
said separation media extends laterally relative to said axial direction;
said gas-liquid stream flows axially against said upstream face surface of said separation media;
said housing defines an exit flow passage to said outlet;
said first path flows laterally along said upstream face surface of said separation media to said exit flow passage;
said second path flows axially through said separation media and then laterally to said exit flow passage.

16. The gas-liquid separator assembly according to claim 15 wherein said first and second paths re-join in said exit flow passage.

17. The gas-liquid separator assembly according to claim 16 wherein:
said separation media extends laterally outwardly to a laterally outward boundary;
said first path flows laterally outwardly along said upstream face surface of said separation media and beyond said laterally outward boundary and then flows axially in said exit flow passage.

18. A gas-liquid separator assembly comprising a housing having a flowpath therethrough from upstream to downstream, said housing having an inlet receiving a gas-liquid stream, and an outlet discharging a gas stream, a separator in said housing causing liquid particle separation from said gas-liquid stream, said separator splitting said flowpath into first and second split partial paths, said first split partial path being an impaction-separation path effecting liquid particle separation from said gas-liquid stream by inertial impaction, said second split partial path being a coalescence-separation path effecting liquid particle separation from said gas-liquid stream by coalescence.

19. The gas-liquid separator assembly according to claim 18 wherein:
said separator comprises an impactor and a coalescer;
said impactor comprises a porous impaction surface;
said first split partial path makes a directional change at said porous impaction surface to effect liquid particle separation by inertial impaction;
said second split partial path flows through said porous impaction surface and into said coalescer to effect liquid particle separation by coalescence.

20. The gas-liquid separator assembly according to claim 19 wherein:
said housing defines a loop-back passage directing said first split partial path from said porous impaction surface to re-join said second split partial path downstream of said coalescer;
said first and second split partial paths each flow to said outlet such that if said coalescer plugs and blocks flow of said second split partial path therethrough, said first split partial path continues to flow to said outlet;
said separator comprises separation media having an upstream face surface providing said porous impaction surface, and depth media extending downstream from said upstream face surface and passing said second split partial path therethrough to provide said liquid particle separation by coalescence.

21. The gas-liquid separator assembly according to claim 20 wherein:
said housing comprises media support structure supporting said separation media and defining a plenum downstream of said upstream face surface and receiving said second split partial path;
said plenum has a sidewall with one or more openings passing said second split partial path therethrough after said coalescence; and
said second split partial path flows from said one or more openings to said outlet.

* * * * *